United States Patent
Chun et al.

(10) Patent No.: US 7,996,449 B2
(45) Date of Patent: Aug. 9, 2011

(54) STORAGE MEDIUM STORING AUDIO-VISUAL DATA INCLUDING METADATA, REPRODUCING APPARATUS, AND METHOD OF SEARCHING FOR AUDIO-VISUAL DATA USING THE METADATA

(75) Inventors: Hye-jeong Chun, Yongin-si (KR); Jung-wan Ko, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 404 days.

(21) Appl. No.: 12/044,109

(22) Filed: Mar. 7, 2008

(65) Prior Publication Data

US 2008/0154947 A1  Jun. 26, 2008

Related U.S. Application Data

(63) Continuation of application No. 11/257,005, filed on Oct. 25, 2005, now Pat. No. 7,640,270.

(30) Foreign Application Priority Data

Nov. 11, 2004 (KR) ................................ 2004-92107
Jun. 21, 2005 (KR) ................................ 2005-53614

(51) Int. Cl.
*G06F 17/30* (2006.01)
*G06F 17/00* (2006.01)
(52) U.S. Cl. ..................................................... 707/825
(58) Field of Classification Search .............. 707/661, 707/821, 705, 825
See application file for complete search history.

(56) References Cited

U.S. PATENT DOCUMENTS

| 5,579,516 A | 11/1996 | Van Maren et al. |
| 5,611,066 A | 3/1997 | Keele et al. |
| 5,751,672 A | 5/1998 | Yankowski |
| 5,819,103 A | 10/1998 | Endoh et al. |
| 5,884,298 A | 3/1999 | Smith et al. |

(Continued)

FOREIGN PATENT DOCUMENTS

EP  0 569 245  11/1993

(Continued)

OTHER PUBLICATIONS

Russian Office Action issued on Nov. 20, 2008, in Russian Patent Application No. 2007117503 (in Russian with complete English translation).

(Continued)

*Primary Examiner* — James Trujillo
*Assistant Examiner* — Dawaune Conyers
(74) *Attorney, Agent, or Firm* — NSIP Law

(57) ABSTRACT

A reproducing apparatus for reproducing audio-visual data stored in a storage medium includes a storage unit which stores metadata used to search for desired audio-visual data in the audio-visual data stored in the storage medium, and a search unit which searches for the desired audio-visual data using the metadata stored in the storage unit, wherein the metadata includes a volume identifier indicating a volume comprised of a plurality of discs used to create a disc library stored in the storage unit. The metadata may further include disc information and title information common to the discs, and the search unit may create the disc library using the disc information, the title information, and the volume information, and search for the desired audio-visual data using the created disc library.

4 Claims, 10 Drawing Sheets

U.S. PATENT DOCUMENTS

| | | | |
|---|---|---|---|
| 5,889,746 | A | 3/1999 | Moriyama et al. |
| 5,943,304 | A | 8/1999 | Kamada et al. |
| 6,339,572 | B1 | 1/2002 | Hamada et al. |
| 6,356,971 | B1 | 3/2002 | Katz et al. |
| 6,393,430 | B1 | 5/2002 | Van Ryzin |
| 6,424,614 | B1 | 7/2002 | Kawamura et al. |
| 6,741,798 | B2 | 5/2004 | Maruyama et al. |
| 7,051,048 | B2 | 5/2006 | Sohma et al. |
| 2002/0198864 | A1 | 12/2002 | Ostermann et al. |
| 2004/0175159 | A1* | 9/2004 | Oetzel et al. ............ 386/125 |
| 2004/0199511 | A1* | 10/2004 | Fujisawa et al. ............ 707/9 |
| 2004/0255330 | A1 | 12/2004 | Logan |
| 2004/0267742 | A1 | 12/2004 | Polson et al. |
| 2006/0101061 | A1 | 5/2006 | Chun et al. |
| 2008/0154946 | A1* | 6/2008 | Chun et al. ............ 707/102 |

FOREIGN PATENT DOCUMENTS

| | | |
|---|---|---|
| EP | 0 869 497 | 10/1998 |
| EP | 1102271 | 5/2001 |
| EP | 1102276 | 5/2001 |
| JP | 11-73348 | 3/1999 |
| JP | 2000-137973 A | 5/2000 |
| JP | 2001-184802 | 7/2001 |
| JP | 2001-216726 | 8/2001 |
| JP | 2002-108892 | 4/2002 |
| JP | 2003-122761 | 4/2003 |
| WO | WO 02/054769 | 7/2002 |

OTHER PUBLICATIONS

International Search Report mailed on Dec. 30, 2005, in International Application No. PCT/KR2005/003656.

Written Opinion of the International Searching Authority mailed on Dec. 30, 2005, in International Application No. PCT/KR2005/003656.

U.S. Appl. No. 11/257,005, filed Oct. 25, 2005, Hye-jeong Chun et al., Samsung Electronics Co., Ltd.

U.S. Appl. No. 12/044,095, filed Mar. 7, 2008, Hye-jeong Chun et al., Samsung Electronics Co., Ltd.

U.S. Appl. No. 12/044,103, filed Mar. 7, 2008, Hye-jeong Chun et al., Samsung Electronics Co., Ltd.

International Standard ISO 9660, *Information processing—Volume and file structure of CD-ROM for information interchange*, First edition Apr. 15, 2008, Corrected and reprinted Sep. 1, 1988, pp. i-x and 1-31, International Organization for Standardization, Geneva, Switzerland.

Standard ECMA-167, *Volume and File Structure for Write-Once and Rewritable Media using Non-Sequential Recording for Information Interchange*, 3rd Edition, Jun. 1997, pp. i-vii, 1/1-5/8, and index, Ecma International, Geneva, Switzerland.

Extended European Search Report issued on Jun. 11, 2008, in European Application No. 05820431.4 including Supplementary European Search Report and European Search Opinion.

Mexican Office Action issued on Sep. 4, 2009, in Mexican Patent Application No. MX/a/2007/005460 (in Spanish, no English translation, 2 pages).

"Guide to DVD Shrink—Combining Titles from different DVDs" (Guides and Tutorials from Club MyCE) [online], Dec. 10, 2003 [retrieved on Jul. 24, 2010]. Retrieved from the Internet: <http://club.myce.com/f72/guide-dvd-shrink-combining-titles-different-dvds-77155/>.

Japanese Office Action issued on Apr. 12, 2011, in counterpart Japanese Application No. 2007-541093 (4 pages, in Japanese, no English translation).

* cited by examiner

STORAGE MEDIUM STORING AUDIO-VISUAL DATA INCLUDING METADATA, REPRODUCING APPARATUS, AND METHOD OF SEARCHING FOR AUDIO-VISUAL DATA USING THE METADATA

CROSS-REFERENCE TO RELATED APPLICATIONS

This application is a continuation of application Ser. No. 11/257,005 filed on Oct. 25, 2005, now U.S. Pat. No. 7,640,270, which claims the priority of Korean Patent Application Nos. 2004-92107 filed on Nov. 11, 2004, and 2005-53614 filed on Jun. 21, 2005, in the Korean Intellectual Property Office. The disclosures of application Ser. No. 11/257,005 and Korean Patent Application Nos. 2004-92107 and 2005-53614 are incorporated herein by reference in their entirety.

BACKGROUND OF THE INVENTION

1. Field of the Invention

An aspect of the present invention relates to a storage medium storing audio-visual data, and more particularly to a storage medium storing audio-visual data including metadata, a reproducing apparatus, and a method of searching for desired audio-visual data using the metadata.

2. Description of the Related Art

Discs are recording media that store various contents including audio-visual data such as movies, games, and advertisements. Discs also store metadata, i.e., information regarding the contents recorded thereon. Specifically, metadata includes information regarding a title, a date of production, an actor, a director, and the like. By browsing the metadata, a user can easily find contents of a desired title or contents in which a desired actor stars.

When a disc is loaded into a reproducing apparatus, metadata recorded on the disc is stored in the reproducing apparatus in the form of a disc library. As the number of discs loaded into the reproducing apparatus increases, metadata stored in the discs accumulates in the reproducing apparatus, which, in turn, requires a larger storage space for the disc library. In addition, a user has to spend a lot of time browsing the metadata to find desired contents. Thus, metadata management is required to efficiently manage storage space when the number of discs loaded into the reproducing apparatus is high.

SUMMARY OF THE INVENTION

An aspect of the present invention relates to a storage medium storing audio-visual data including metadata, a reproducing apparatus, and a method of searching for audio-visual data using the metadata.

According to an aspect of the present invention, a storage medium stores audio-visual data and metadata used to search for desired audio-visual data in the audio-visual data stored in the storage medium, wherein the metadata includes a volume identifier indicating a volume comprised of a plurality of discs used to create a disc library.

The discs may store audio-visual data, and the storage medium may be one of the discs. The disc library may be a group of metadata stored in a storage unit of a reproducing apparatus used to search the desired audio-visual data in the audio-visual data stored in the discs. The volume identifier may be a volume label. The metadata may further include a disc name, the disc name may include an alternative element, and the alternative element may include the volume label.

The volume label may be used to refer to metadata of a volume included in the group of metadata of the disc library stored in the storage unit.

The metadata may further include disc information and title information common to the discs, and information specific to each of the discs. The disc information may include the disc name.

The storage medium may be an optical disc which is insertable into or removable from a reproducing apparatus. Alternatively, the storage medium may be connected to a reproducing apparatus through a network. The metadata may be downloaded to a storage unit of a reproducing apparatus to create the disc library and used to search for the desired audio-visual data.

According to another aspect of the present invention, a reproducing apparatus for reproducing audio-visual data stored in a storage medium includes a storage unit which stores metadata used to search for desired audio-visual data in the audio-visual data stored in the storage medium, and a search unit which searches for the desired audio-visual data using the metadata stored in the storage unit, wherein the metadata includes a volume identifier indicating a volume comprised of a plurality of discs used to create a disc library stored in the storage unit.

The metadata may further include disc information and title information common to the discs, and the search unit may create the disc library using the disc information, the title information, and the volume identifier, and search for the desired audio-visual data using the created disc library.

The metadata may further include information specific to each of the discs, and the search unit may create the disc library using the information specific to each of the discs and the volume identifier, and search for the desired audio-visual data using the created disc library.

The apparatus may further include a user interface unit through which a search condition corresponding to the desired audio-visual data is input by a user, and a display unit which displays the desired audio-visual data on a screen when the search unit finds the desired audio-visual data.

According to another aspect of the present invention, a method of searching for audio-visual data stored in a storage medium includes receiving a search condition corresponding to the desired audio-visual data, and searching for the desired audio-visual data by searching for metadata meeting the search condition in metadata used to search for the desired audio-visual data, wherein the metadata includes a volume identifier indicating a volume comprised of a plurality of discs used to create a disc library.

According to another aspect of the present invention, a storage medium stores metadata used to search for desired data, wherein the metadata stored in the storage medium includes an identifier identifying a group of metadata units used in creating a metadata library.

The metadata library may include a single copy of any piece of metadata common to at least two of the metadata units of the group of metadata units, thereby being free of redundant pieces of metadata with respect to the group of metadata units.

The metadata stored in the storage medium may further include title information regarding an audio-visual data title. The title information may include a title name, or a title type, or an organization involved in production and release of a title, or an actor, or a director, or a producer, or a music producer, or a screenwriter, or a genre, or a language, or a parental guide, or a motion picture rating, or a review, or a synopsis, or an award list, or a URL address of related information, or any combination thereof.

According to another aspect of the present invention, a reproducing apparatus for reproducing data stored in a storage medium includes a storage unit which stores a metadata library, and a search unit which searches for desired data in the data stored in the storage medium using the metadata library, wherein the storage medium has stored therein metadata to be used to search for the desired data in the data stored in the storage medium, wherein the metadata library includes the metadata stored in the storage medium, and wherein the metadata stored in the storage medium includes an identifier identifying a group of metadata units used in creating the metadata library.

According to another aspect of the present invention, a method of searching for desired data in data stored in a storage medium includes searching for the desired data in the data stored in the storage medium using a metadata library, wherein the storage medium has stored therein metadata to be used to search for the desired data in the data stored in the storage medium, wherein the metadata library includes the metadata stored in the storage medium, and wherein the metadata stored in the storage medium includes an identifier identifying a group of metadata units used in creating the metadata library.

According to another aspect of the invention, a computer-readable medium or a carrier wave is encoded with processing instructions for implementing a method of searching for desired data in data stored in a storage medium performed by a computer. The method includes searching for the desired data in the data stored in the storage medium using a metadata library, wherein the storage medium has stored therein metadata to be used to search for the desired data in the data stored in the storage medium, wherein the metadata library includes the metadata stored in the storage medium, and wherein the metadata stored in the storage medium includes an identifier identifying a group of metadata units used in creating the metadata library.

The computer-readable medium may be a magnetic recording medium or an optical recording medium.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
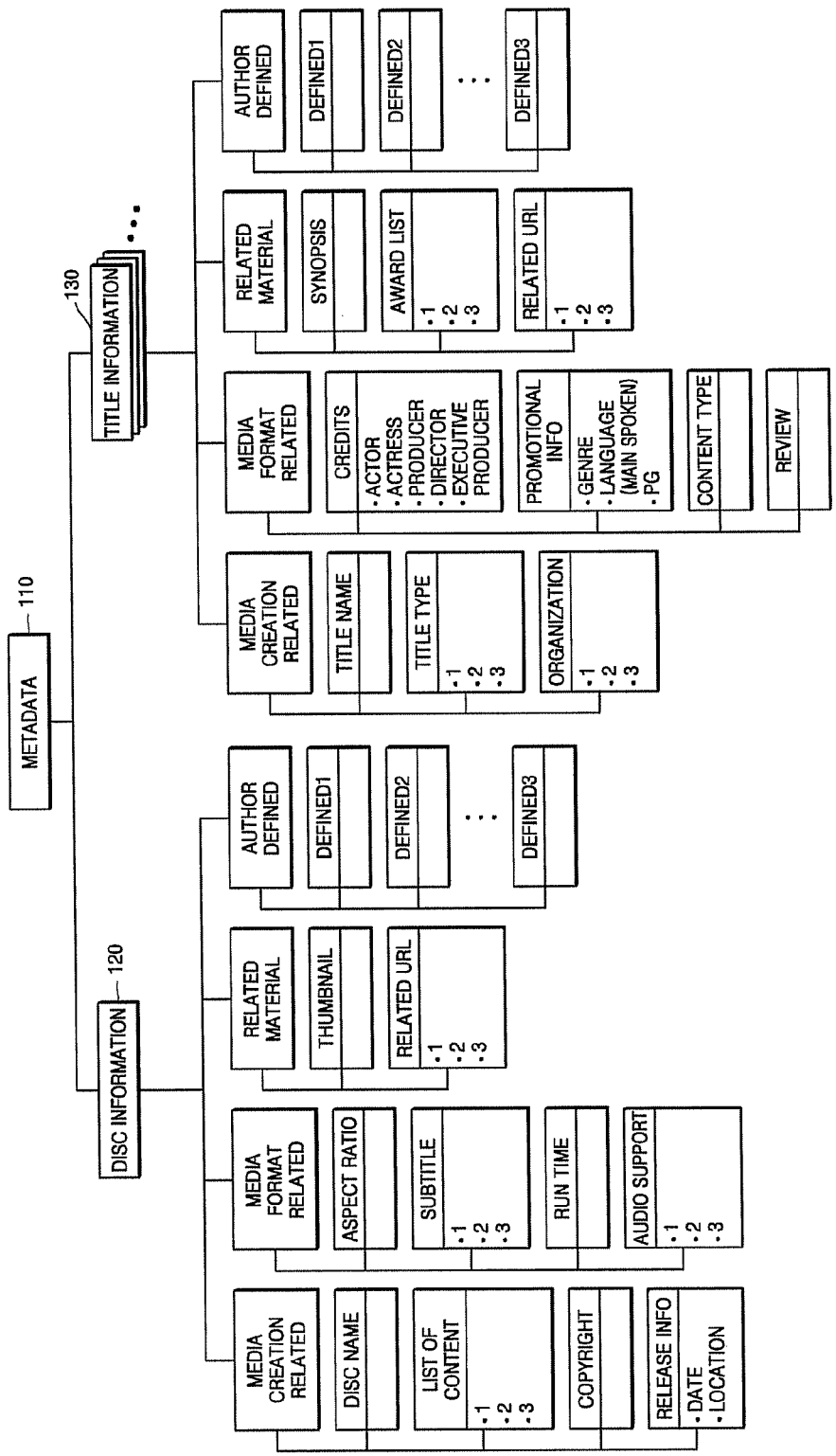
FIG. 1 illustrates a structure of metadata.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 illustrates a structure of metadata 110. Referring to FIG. 1, the metadata 110 recorded on a disc includes disc information 120, which is information regarding the disc or information commonly applied to all titles, and title information 130 regarding titles recorded on the disc.

The disc information 120 may include metadata regarding the creation of the disc, metadata regarding a disc format, metadata regarding material related to the disc, and other metadata defined by an author of the disc. Specifically, the metadata regarding the creation of the disc includes a disc name, a list of content, a copyright, and release information. The metadata regarding the disc format includes an aspect ratio, a subtitle, a run time, and an audio support. The metadata regarding the material related to the disc may include a thumbnail and a URL address of related information.

Similarly, the title information 130 may include metadata regarding the creation of the content, metadata regarding a content format, metadata regarding material related to the content, and other metadata defined by an author of the content.

The metadata regarding the creation of the content includes a title name, a title type, and an organization involved in the production and release of a title. The metadata regarding the content format includes credits, promotional information, a content type, and a review. The credits refer to information regarding people involved in the production of a title, such as an actor, a director, a producer, a music producer, and a screenwriter. The promotional information includes a genre, a language, and a parental guide (a motion picture rating). The metadata regarding the material related to the content may include a synopsis, an award list, and a URL address of related information.

Figure 2:
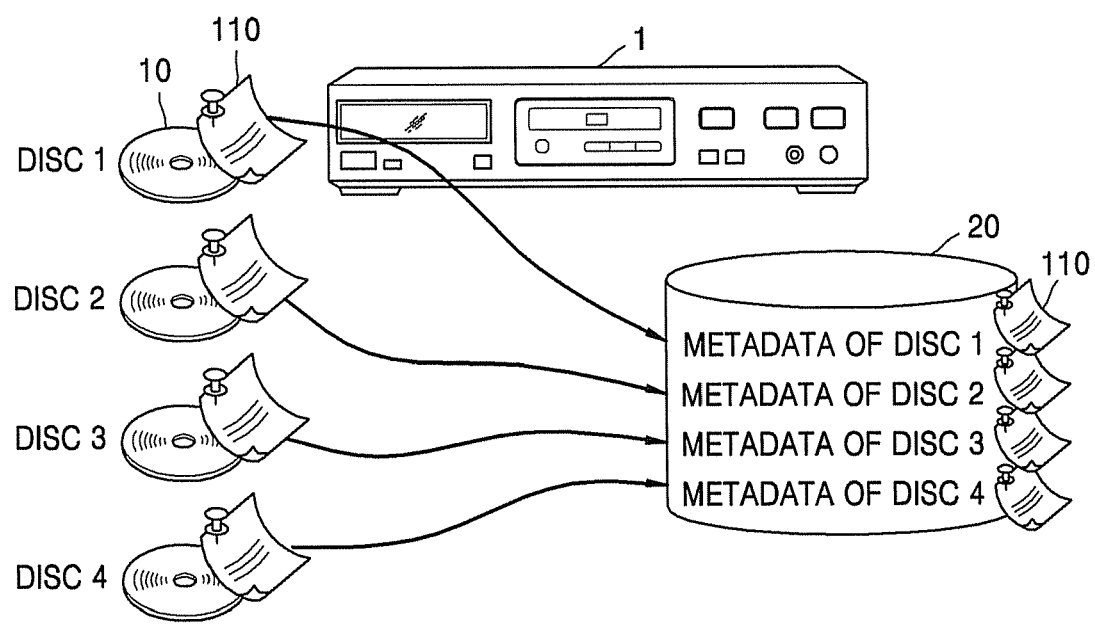
FIG. 2 illustrates a conventional method of configuring a disc library using metadata.

FIG. 2 illustrates a conventional method of configuring a disc library using metadata. Referring to FIG. 2, the conventional metadata 110 is recorded on each of first through fourth discs 10. When each of the first through fourth discs 10 is inserted and loaded into a reproducing apparatus 1, the metadata 110 corresponding to each of the first through fourth discs 10 is stored separately in a storage unit 20, i.e., a hard disc, of the reproducing apparatus 1. Therefore, as the number of discs loaded into the reproducing apparatus 1 increases, so does the amount of the metadata 110 stored in the storage unit 20 of the reproducing apparatus 1.

Since the metadata 110 of the first through fourth discs 10 is stored in the storage unit 20 of the reproducing apparatus 1, a user can retrieve information regarding a desired disc using the stored metadata 110. A disc library refers to such a group of metadata stored in a storage unit of a reproducing apparatus and used to search for information regarding a particular disc. With reference to the stored disc library, the reproducing apparatus 1 may provide diverse search functions to a user even when the first through fourth discs 10 are not loaded.

Since the discs 10 having different contents also have different metadata, the metadata 110 is downloaded separately from each of the first through fourth discs 10 and then stored accordingly. As illustrated in FIG. 2, the metadata 110 of the first through fourth discs 10 is stored separately in the storage unit 20 of the reproducing apparatus 1. Therefore, an increase in the number of discs loaded into the reproducing apparatus 1 results in a proportional increase in the amount of the metadata 110 stored in the storage unit 20 of the reproducing apparatus 1, thereby making it difficult to efficiently utilize storage space. Further, since the amount of metadata that a user has to search to find desired data increases, search efficiency is undermined.

Although not shown, the metadata 110 of the first through fourth discs 10 may also be downloaded to the reproducing apparatus 1 from a network. In this case, the same problems described above occur. To solve these problems, a method of efficiently downloading and managing the metadata 110 even when the number of discs increases is required.

Figure 3:
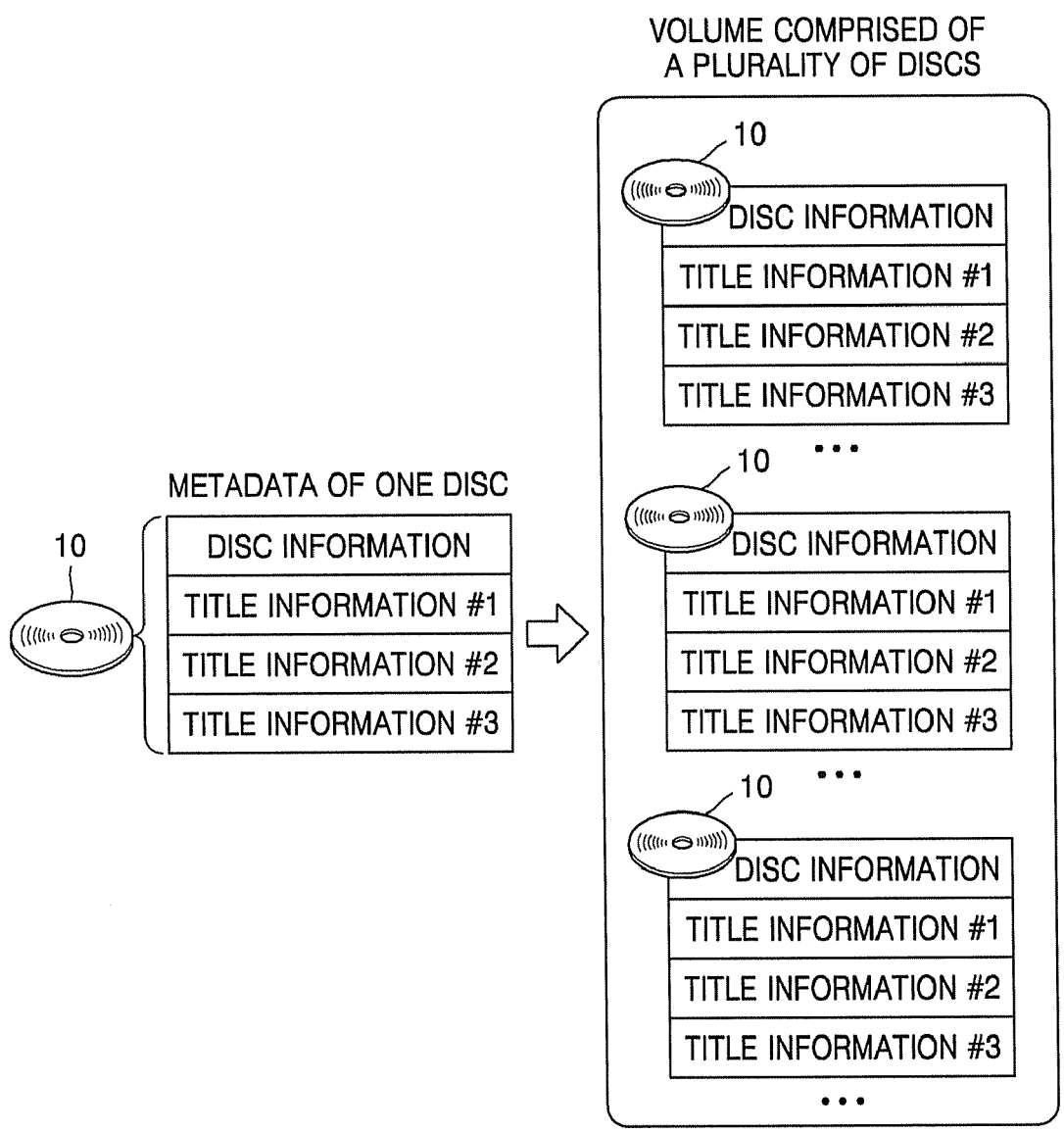
FIG. 3 illustrates a conventional disc library configured according to the method of FIG. 2.

FIG. 3 illustrates a conventional disc library configured according to the method of FIG. 2. Referring to FIG. 3, a disc library created when there is one disc is illustrated on the left, and a disc library created when there are a plurality of discs constituting a volume is illustrated on the right. As shown on the right, as the number of discs loaded into a reproducing apparatus increases, the amount of metadata included in the disc library also increases proportionately.

However, the discs constituting the volume may have a lot of overlapping metadata. For example, in the case of a volume comprised of a plurality of discs for a soap opera, a martial art series, or a complete collection of classical music, each of the discs may include a lot of overlapping metadata.

To solve this problem, a storage medium storing audio-visual data including metadata for efficiently managing a plurality of discs, a reproducing apparatus, and a method of searching for the audio-visual data using the metadata will now be described.

Figure 4:
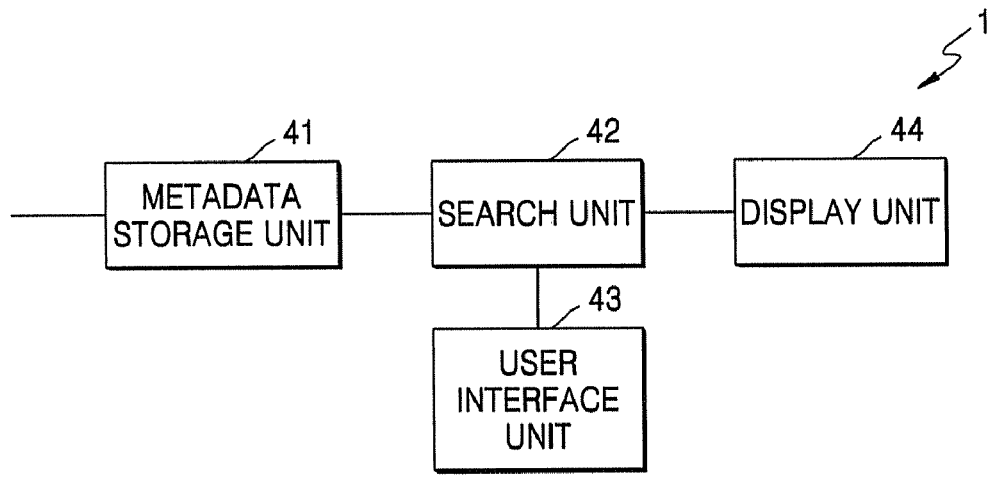
FIG. 4 is a block diagram of a multimedia data reproducing apparatus according to an embodiment of the present invention.

FIG. 4 is a block diagram of a multimedia data reproducing apparatus 1 according to an embodiment of the present invention. Referring to FIG. 4, using a search unit 42, the multimedia data reproducing apparatus 1 searches for metadata stored in a metadata storage unit 41 according to a search condition and displays the search result on a display unit 44. To this end, the multimedia data reproducing apparatus 1 includes the metadata storage unit 41, the search unit 42, a user interface unit 43, and the display unit 44.

The metadata storage unit 41 stores metadata received from a storage medium such as a disc, or from a network. After a user inserts and loads a storage medium into the multimedia data reproducing apparatus 1, metadata of the storage medium is not deleted, but remains in the metadata storage unit 41 even when the storage medium is ejected. The user interface unit 43 receives a search condition for a group of metadata thus stored, i.e., a disc library, from a user. In other words, the user interface unit 43 receives a search keyword such as a disc title, an actor, or a director through a remote controller or various user interface devices.

The search unit 42 searches the metadata in the disc library and outputs metadata corresponding to the search condition input by the user to the display unit 44. A method of searching the metadata using the search unit 42 will be described later.

Figure 5:
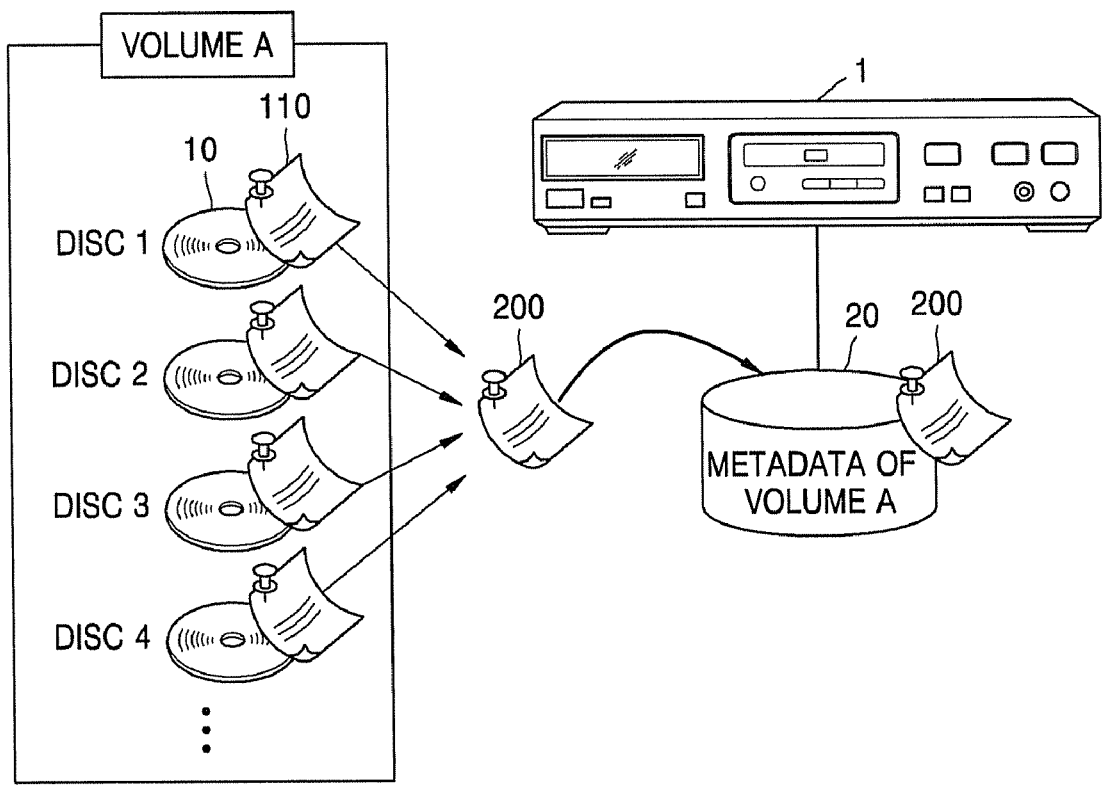
FIG. 5 illustrates a method of configuring a disc library using metadata according to an embodiment of the present invention.

FIG. 5 illustrates a method of configuring a disc library using metadata according to an embodiment of the present invention. Referring to FIG. 5, metadata 110 of a plurality of discs 10 is organized into metadata 200 of a Volume A, which is then stored in a storage unit 20 of a reproducing apparatus 1. In the case of the conventional disc library, metadata of each disc is separately stored and managed. However, in the present embodiment, metadata, which was managed separately for each disc in the conventional method, is bundled in a volume, and stored and managed in units of volumes. That is, metadata is divided into metadata common to an entire volume and metadata specific to each disc, and stored and managed accordingly.

A conventional method of configuring a disc library using metadata will now be compared with a method of configuring a disc library using metadata according to an embodiment of the present invention.

Figure 6A:
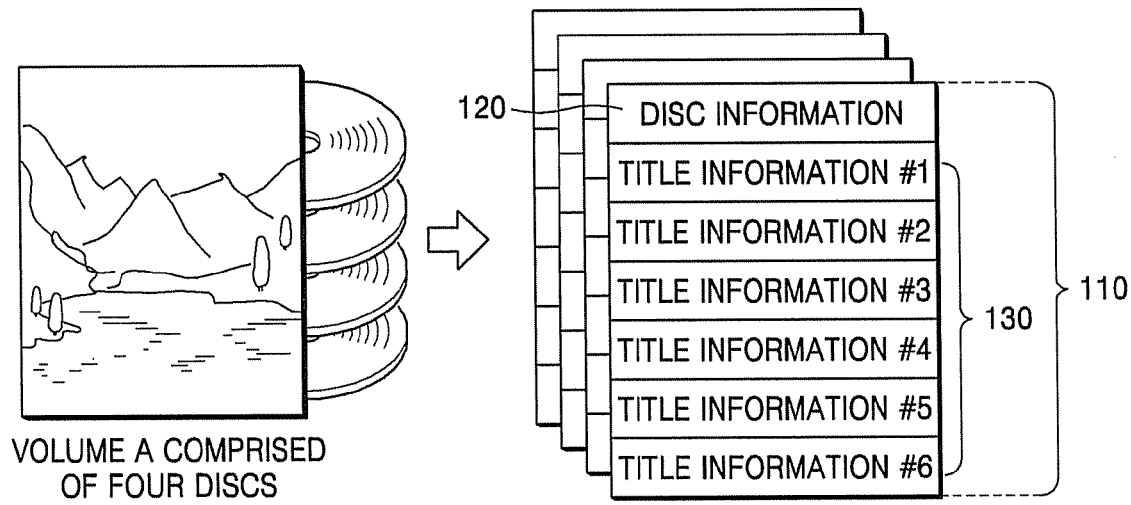
FIG. 6A illustrates a conventional method of configuring a disc library.

FIG. 6A illustrates the conventional method of configuring a disc library. Generally, a soap opera is released as one volume for each season, and in each volume, more than 20 episodes are stored in a plurality of discs. For example, 24 episodes included in Volume 6 of a sitcom are separately stored in four different discs. In other words, a volume includes four discs, and each disc contains six titles. Accordingly, the metadata 110 of each disc includes disc information 120 regarding the disc and six title information 130.

Referring to FIG. 6A, Volume A including four discs contains four metadata 110. That is, four disc information 120 and 24 title information 130 are included in Volume A. Most of the metadata 110 of the four discs, such as a disc title, an actor, a date of release, an encoding scheme, an aspect ratio, a video format, a rating, and a production company, is overlapping. According to the conventional method of configuring a disc library using metadata, metadata is separately stored and managed for each disc. Therefore, the amount of overlapping metadata increases in proportion to the number of discs.

However, in the method of configuring a disc library using metadata according to the present invention, metadata of a plurality of discs that constitute a volume is divided into metadata common to an entire volume and metadata specific to each disc, and stored and managed accordingly.

Figure 6B:
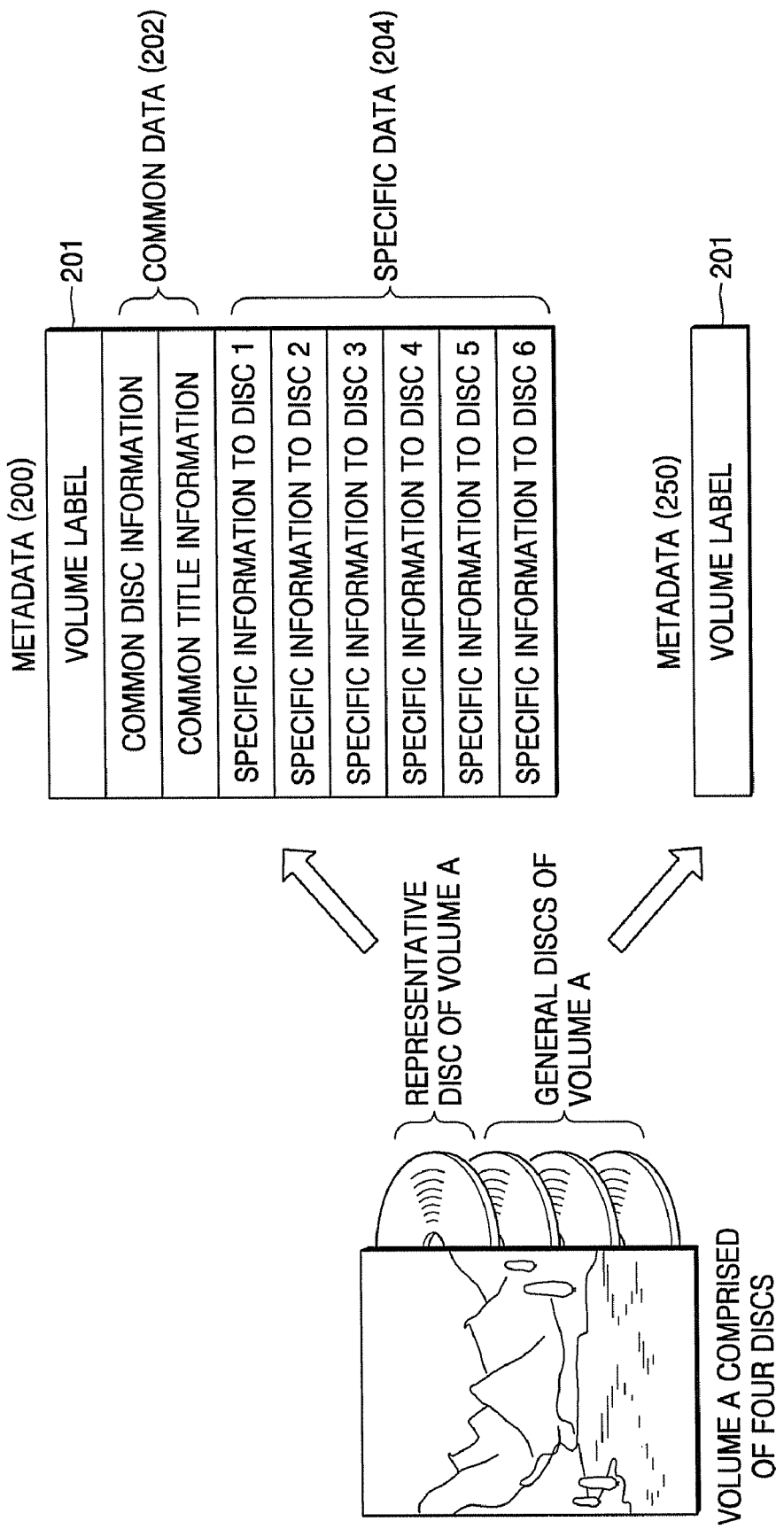
FIG. 6B illustrates a method of configuring a disc library according to an the embodiment of the present invention.

FIG. 6B illustrates the method of configuring a disc library according to an embodiment of the present invention. Referring to FIG. 6B, a representative disc of Volume A stores metadata 200 for the entire Volume A, and the remaining general discs store metadata 250 regarding a volume label 201 of the representative disc. Therefore, when the representative disc is loaded into a reproducing apparatus, the metadata 200 for the entire Volume A is downloaded and stored in a storage unit of the reproducing apparatus. Even without having separate metadata, the remaining general discs may refer to the metadata 200 for the entire Volume A using an identifier, i.e., the volume label 201, of the representative disc.

Hence, storage space can be saved, and a more efficient search function using metadata can be provided because the amount of metadata that a user has to search to find desired data is reduced.

The metadata 200 for the entire Volume A stored in the representative disc is divided into a volume label 201 of the representative disc, common data 202 common to the discs, and specific data 204 specific to each disc. In other words, data common to the disc information 120 and the title information 130, which constitute metadata of each disc, is stored in an area 202 for common data, and data specific to each disc is stored in an area 204 for specific data. Since overlapping portions of metadata of a plurality of discs are bundled and data specific to each disc is stored separately in this way, the size of metadata included in a volume can be reduced. Unlike the conventional metadata illustrated in FIG. 6A, the metadata illustrated in FIG. 6B has overlapping portions removed. Thus, the method of configuring metadata according to the present embodiment makes it possible to configure metadata such that the metadata can be stored and searched more efficiently.

Figure 6C:
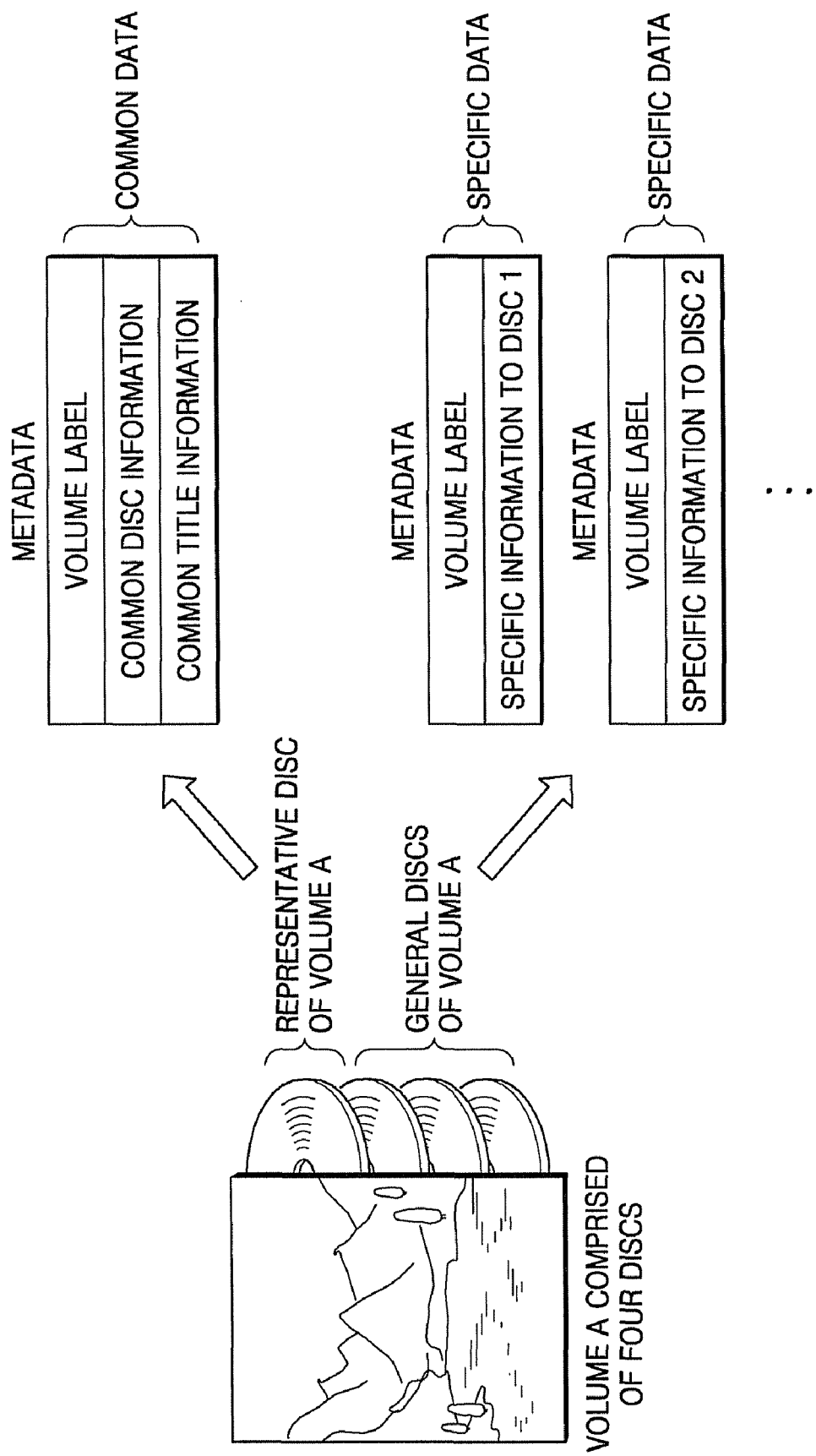
FIG. 6C illustrates a method of configuring a disc library according to another embodiment of the present invention.

FIG. 6C illustrates a method of configuring a disc library according to another embodiment of the present invention. Referring to FIG. 6C, a representative disc of Volume A stores information regarding a volume label and metadata common to all discs included in Volume A. Each of the remaining general discs stores information regarding a volume label and metadata specific to itself. Therefore, when the representative disc is loaded into a reproducing apparatus, the metadata common to all discs included in Volume A is downloaded and stored in a storage unit of the reproducing apparatus.

When the remaining general discs are loaded into the reproducing apparatus, the metadata specific to each of the remaining general discs is downloaded using the volume label and stored in the storage unit of the reproducing apparatus. Then, the metadata common to all discs included in Volume A is combined with the metadata specific to each disc to create a disc library. By searching this disc library, a user can find audio-visual data that meets a desired search condition.

Hence, storage space can be saved, and a more efficient search function using metadata can be provided because the amount of metadata that a user has to search to find desired data is reduced. Unlike the conventional metadata illustrated in FIG. 6A, the metadata illustrated in FIG. 6C has overlapping portions removed. Thus, the method of configuring metadata according to the present embodiment makes it possible to configure metadata such that the metadata can be stored and searched more efficiently.

Figure 7:
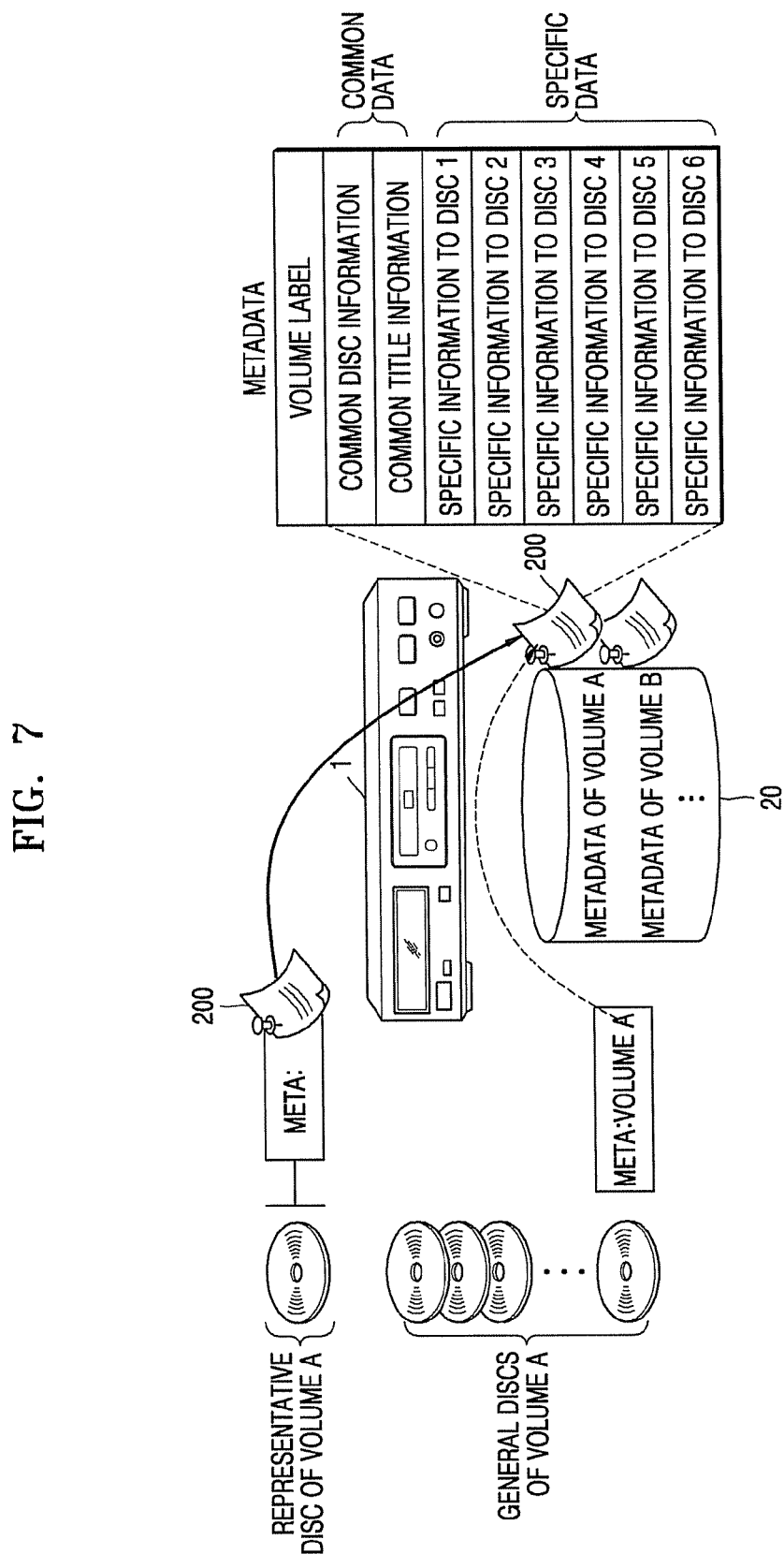
FIG. 7 illustrates a method of reproducing a disc using metadata according to the embodiment of the present invention illustrated in FIG. 6B.

FIG. 7 illustrates a method of reproducing a disc using metadata according to the embodiment illustrated in FIG. 6B. Referring to FIG. 7, when a representative disc of Volume A is loaded into a reproducing apparatus 1, metadata 200 for the Volume A is stored in a storage unit 20 of the reproducing apparatus 1. Using the stored metadata 200, audio-visual data can be retrieved. In addition, once the remaining general discs in Volume A are loaded into the reproducing apparatus 1, audio-visual data can be retrieved by referring to the stored metadata 200 for Volume A using an identifier, i.e., a volume label, recorded on each disc.

Although not shown in the embodiment illustrated in FIG. 7, when the representative disc of Volume A of the embodiment of the present invention illustrated in FIG. 6C is loaded into the reproducing apparatus 1, metadata common to all discs included in Volume A is stored in the storage unit 20 of the reproducing apparatus 1. When the remaining general discs are loaded into the reproducing apparatus 1, metadata specific to each disc is stored in the storage unit 20 of the reproducing apparatus 1. Then, the metadata common to all discs included in Volume A is combined with the metadata specific to each disc to create a disc library. By searching this disc library, a user can find audio-visual data that meets a desired search condition. Here, audio-visual data can be retrieved by referring to the stored metadata for Volume A using an identifier, i.e., a volume label, recorded on each disc.

Figure 8:
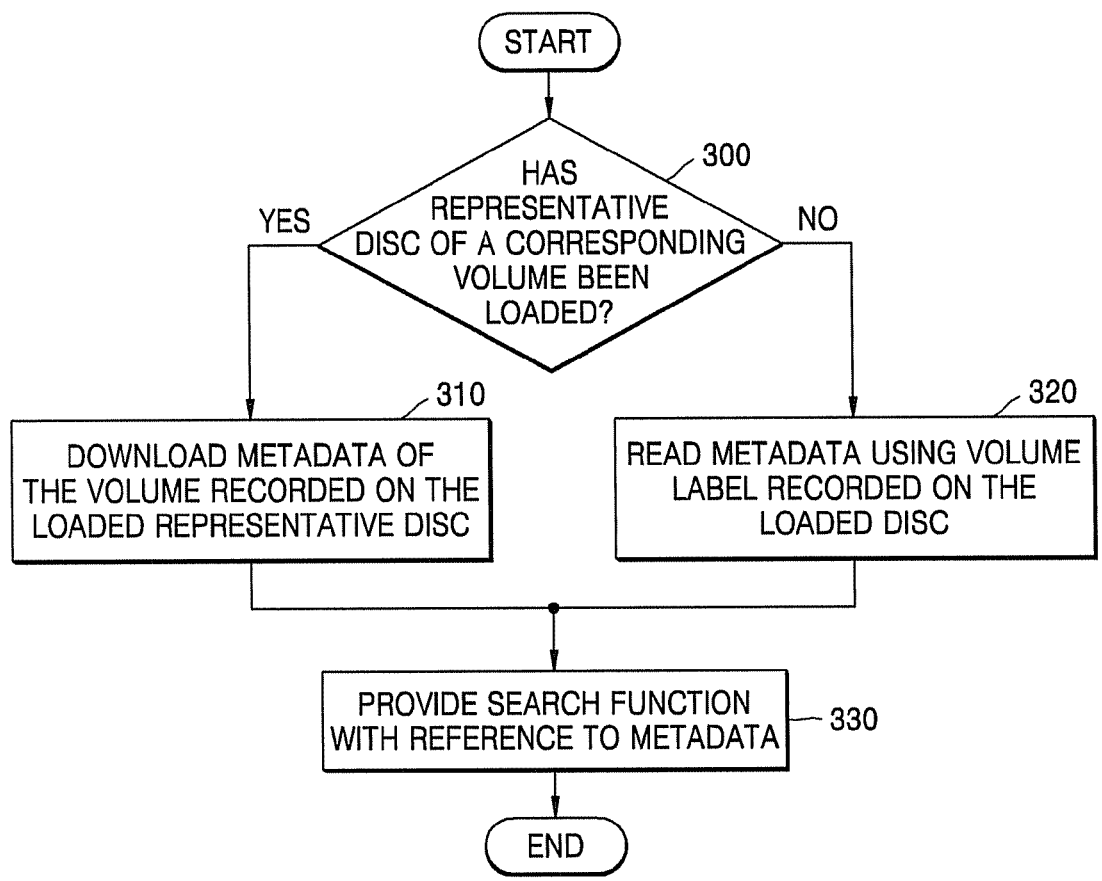
FIG. 8 is a flowchart illustrating a method of searching for multimedia data using metadata according to the embodiment of the present invention illustrated in FIG. 6B.

FIG. 8 is a flowchart illustrating a method of searching for multimedia data using metadata according to the embodiment of the present invention illustrated in FIG. 6B. Referring to FIG. 8, it is checked whether a representative disc of a corresponding volume is loaded into a reproducing apparatus (operation 300). If it is determined that the representative disc is loaded, metadata for the entire volume recorded on the loaded representative disc is downloaded and stored in a storage unit of the reproducing apparatus (operation 310). If it is determined that the representative disc is not loaded, i.e., that a general disc is loaded instead, the metadata for the entire volume stored in the storage unit of the reproducing apparatus is read using a volume identifier, i.e., a volume label, recorded on the loaded disc (operation 320).

Using the read metadata, multimedia data such as audio-visual data is searched for (operation 330). In other words, multimedia data that meets a desired search condition input through a user interface unit can be found with reference to the metadata for the entire volume. Also, although not shown in the embodiment of the present invention illustrated in FIG. 8, audio-visual data can be searched for using metadata according to the embodiment of the present invention illustrated in FIG. 6C.

Figure 9:
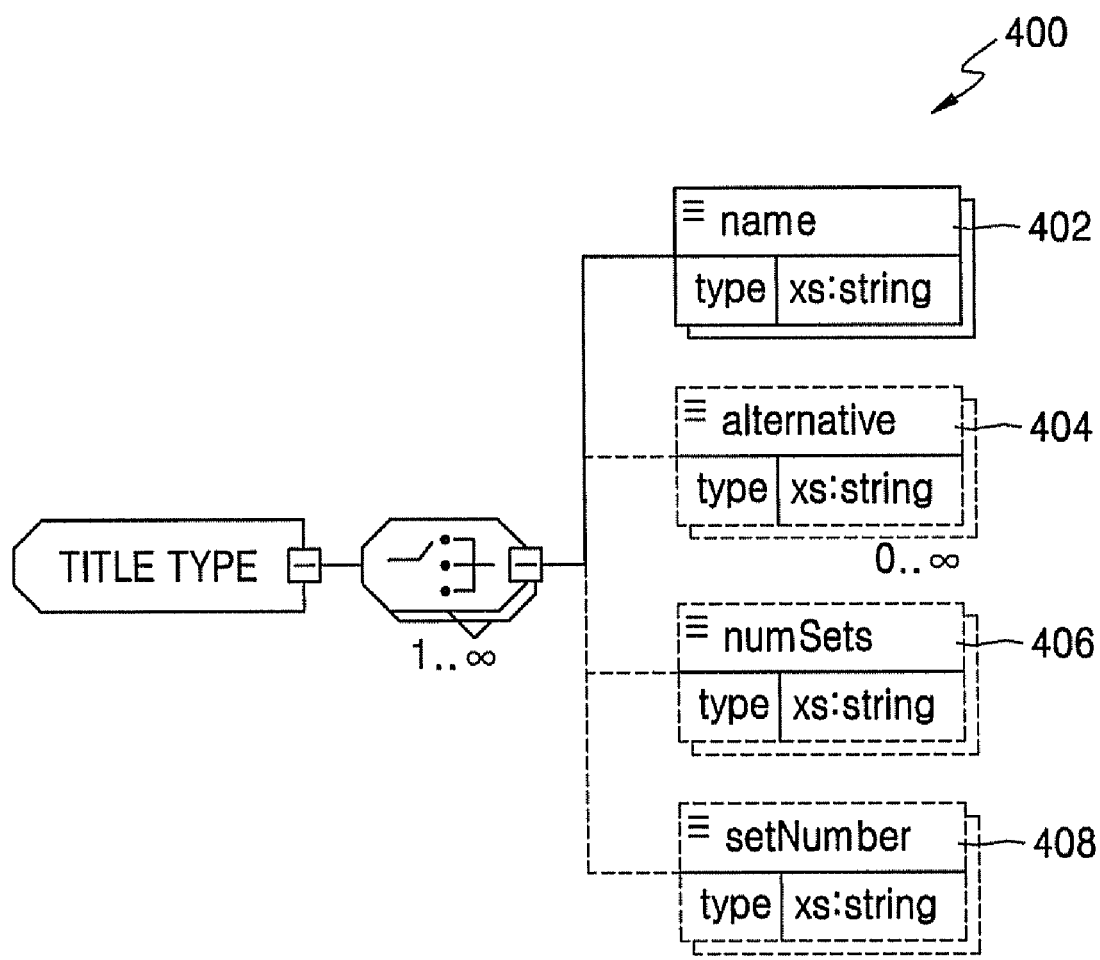
FIG. 9 illustrates a data structure of a disc name that includes a volume label in disc information according to an embodiment of the present invention.

FIG. 9 illustrates a data structure of a disc name 400 that includes a volume label in the disc information 120 according to an embodiment of the present invention. Referring to FIGS. 1 and 9, the metadata 110 according to the present invention contains the disc information 120 which includes the disc name 400. FIG. 9 illustrates the data structure of the disc name 400 according to an embodiment of the present invention. The disc name 400 includes a name element 402, an alternative element 404, a numSets element 406, and a setNumber element 408.

The name element 402 indicates a name of a disc. The alternative element 404 is an alternative name of the disc, such as a title abbreviation, a nickname, and a volume label. As described above, the volume label indicates a plurality of discs that constitute a volume. In other words, the volume label indicates to which volume a disc belongs. Thus, with reference to the volume label, metadata included in a disc library can be efficiently searched for. The numSets element 406 indicates the number of discs constituting a volume, and the setNumber element 408 indicates a serial number of a disc in a volume, that is, a position of the disc in the volume.

Examples of storing metadata from a disc have been described above. Metadata may also be downloaded from a network in a similar way, thereby saving storage space and enhancing search functions.

As described above, the present invention relates to a storage medium storing audio-visual data including metadata for efficiently managing a plurality of discs, a reproducing apparatus, and a method of searching for the audio-visual data using the metadata.

According to the present invention, metadata of a plurality of discs that constitute a volume is divided into common data common to all discs of the volume and specific data specific to each disc, and stored in a representative disc and the remaining general discs of the volume accordingly. Each disc stores a volume label, i.e., an identifier, of the representative disc by which the metadata of the volume can be referred to. Therefore, metadata downloaded from each disc can be referred to using the volume label. Consequently, storage space can be saved and search efficiency can be enhanced, thereby facilitating efficient management of the discs.

The present invention can also be implemented as computer-readable code encoded in a computer-readable recording medium or a carrier wave. Code and code segments for accomplishing the present invention can be easily written by programmers skilled in the art to which the present invention pertains.

A computer-readable recording medium is any data storage device that can store data which can be thereafter read and executed by a computer. Examples of a computer-readable recording medium include a magnetic recording medium and an optical recording medium.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus for forming a disc library comprising information about a plurality of information storage media, the apparatus comprising:
   a storage unit to receive from an information storage medium metadata comprising information about audio-visual data included in the information storage medium, and to store the metadata;
   wherein the apparatus forms the disc library using a plurality of metadata recorded in the storage unit; and
   the metadata comprises:
      a common volume identifier indicating that the information storage medium including the audio-visual data is part of a volume constituted by a plurality of information storage media;
      first information about a number of the information storage media constituting the volume;
      second information about a sequence order in the volume of the information storage medium including the audio-visual data; and
      a thumbnail image related to the information storage medium including the audio-visual data.

2. The apparatus of claim 1, wherein the first information is a numSets element, and the second information is a setNumber element.

3. The apparatus of claim 1, wherein the common volume identifier is common to all of the information storage media constituting the volume.

4. The apparatus of claim 1, wherein the common volume identifier is stored in each of the information storage media constituting the volume.

\* \* \* \* \*